(12) United States Patent
Tashiro et al.

(10) Patent No.: US 11,047,459 B2
(45) Date of Patent: Jun. 29, 2021

(54) BALL SCREW DEVICE

(71) Applicant: JTEKT CORPORATION, Osaka (JP)

(72) Inventors: Akiyoshi Tashiro, Yamatotakada (JP); Hirofumi Dodoro, Kashihara (JP)

(73) Assignee: JTEKT CORPORATION, Osaka (JP)

( * ) Notice: Subject to any disclaimer, the term of this patent is extended or adjusted under 35 U.S.C. 154(b) by 16 days.

(21) Appl. No.: 16/580,043

(22) Filed: Sep. 24, 2019

(65) Prior Publication Data

US 2020/0109771 A1    Apr. 9, 2020

(30) Foreign Application Priority Data

Oct. 9, 2018  (JP) .............................. JP2018-191196

(51) Int. Cl.
*F16H 25/20*    (2006.01)
*F16H 25/22*    (2006.01)
*F16D 125/40*    (2012.01)

(52) U.S. Cl.
CPC ..... *F16H 25/2233* (2013.01); *F16D 2125/40* (2013.01)

(58) Field of Classification Search
CPC .. F16H 25/2233; F16H 25/22; F16H 25/2427; F16H 2025/228; F16H 25/2214; F16F 1/3713; F16D 65/18; F16D 2121/24; F16D 2125/40
See application file for complete search history.

(56) References Cited

U.S. PATENT DOCUMENTS

| 2012/0018262 | A1* | 1/2012 | Winkler | .................. | F16D 65/18 188/106 F |
| 2016/0033018 | A1* | 2/2016 | Tashiro | .................. | F16D 65/18 74/424.81 |
| 2016/0033019 | A1 | 2/2016 | Aramoto et al. | | |
| 2020/0200245 | A1* | 6/2020 | Zinnecker | ........... | F16H 25/2214 |

FOREIGN PATENT DOCUMENTS

JP    2016-035322 A    3/2016

\* cited by examiner

*Primary Examiner* — Zakaria Elahmadi
(74) *Attorney, Agent, or Firm* — Oliff PLC

(57) ABSTRACT

A ball screw device includes a screw shaft; a nut having a second helical groove; and a plurality of balls. When the screw shaft is rotated about an axis of the screw shaft while being subjected to the external force, the balls are displaced from positions under no load condition toward one side in an axial direction. A second helical groove of the nut includes a stopping member configured to prevent the balls from falling off from the second helical groove. A plurality of coil springs are arranged in series along the second helical groove. An angle in a circumferential direction occupied by each of the coil springs about the axis is 180 degrees or less when the coil springs are disposed in the second helical groove.

4 Claims, 8 Drawing Sheets

SECOND AXIAL SIDE

FIRST AXIAL SIDE

SECOND AXIAL SIDE

FIRST AXIAL SIDE

BALL SCREW DEVICE

INCORPORATION BY REFERENCE

The disclosure of Japanese Patent Application No. 2018-191196 filed on Oct. 9, 2018 including the specification, drawings and abstract is incorporated herein by reference in its entirety.

BACKGROUND

1. Technical Field

The disclosure relates to ball screw devices.

2. Description of Related Art

Ball screw devices can convert a rotary motion to a linear motion and are widely used in various fields. For example, Japanese Unexamined Patent Application Publication No. 2016-035322 (JP 2016-035322 A) discloses an automobile brake device 80 including a ball screw device 81, as shown in FIG. 7. The brake device 80 rotates a screw shaft 83 of the ball screw device 81 by a motor 82 to press brake pads 84 against a brake rotor 85, thereby applying a braking force to a wheel (not shown).

The ball screw device 81 is a so-called non-recirculating ball screw device in which balls 89 do not recirculate. The screw shaft 83 has a first helical groove 87 provided on its outer periphery, a nut 86 has a second helical groove 88 provided on its inner periphery, and the nut 86 is fitted on the screw shaft 83. The first helical groove 87 and the second helical groove 88 thus face each other in the radial direction to form a ball groove. The balls 89 are arranged in a row in the ball groove. The arrangement of the balls in a row is called a ball row.

When the brake device 80 is operated, the screw shaft 83 is rotated and the balls 89 roll along the ball groove. When the brake device 80 is released, the screw shaft 83 is rotated in the opposite direction and the balls 89 generally return to their original positions (initial positions). However, the initial positions of the balls 89 may be displaced to positions near a terminal end of the ball groove during repeated use of the brake device 80. When the brake device 80 is operated in this state, the balls 89 quickly reach the terminal end of the ball groove and cannot roll anymore. The screw shaft 83 is therefore not smoothly rotated, which may degrade performance such as the braking force of the brake device 80. Accordingly, as shown in FIG. 8, the ball screw device 81 of JP 2016-035322 A has coil springs 90 at respective sides of the ball row. When the ball screw device 81 is operated, the coil spring 90 is compressed to allow the ball row to move. When operation of the ball screw is finished, the ball row returns to its initial position due to the elastic force of the coil spring 90.

SUMMARY

It is desired to increase the movable range in which the nut 86 of the non-recirculating ball screw device 81 is movable, in order to extend the range in which the ball screw device 81 can be applied. However, when the rotation angle of the screw shaft 83 is increased, the balls 89 roll by a larger amount. Coils (i.e., turns of a wire) of the coil spring 90 are therefore brought into close contact with each other, and the screw shaft 83 cannot be smoothly rotated. One possible method of increasing the movable range of the nut 86 is to increase the overall length of the coil spring 90 to increase the allowable deflection of the coil spring 90. However, when the overall length of the coil spring 90 is increased, the outer periphery of the coil spring 90 is rubbed hard against the inner periphery of the ball groove of the nut 86, and thus the coil spring 90 cannot be smoothly compressed. The allowable deflection of the coil spring 90 is thus substantially decreased, and the balls 89 do not smoothly roll. The transmission efficiency of the ball screw device 81 is therefore reduced. As described above, it is difficult to increase the movable range of the nut 86 in the ball screw device 81 which includes the coil spring 90 on the side toward which the ball row moves, and in which the ball row returns to its initial position when operation of the ball screw device 81 is finished.

The disclosure provides a ball screw device including coil springs disposed on the side toward which a ball row moves when a screw shaft is rotated, including a nut that is movable in an increased range, and having good transmission efficiency in a wide range.

An aspect of the disclosure relates to a ball screw device including a screw shaft having a first helical groove provided on an outer periphery of the screw shaft; a nut having a second helical groove provided on an inner periphery of the nut, the nut being fitted on the outer periphery of the screw shaft; and a plurality of balls disposed between the first helical groove and the second helical groove and supports an external force. When the screw shaft is rotated about an axis of the screw shaft while being subjected to the external force, the balls are displaced from positions under no load condition toward one side in an axial direction, the axial direction being a direction along the axis of the screw shaft. The second helical groove includes a stopping member provided at least at an end of the second helical groove, the end being located on the one side in the axial direction, and the stopping member being configured to prevent the balls from falling off from the second helical groove. A plurality of coil springs are arranged in series along the second helical groove so as to be located between a ball closest to the one side in the axial direction among the balls and the stopping member; and an angle in a circumferential direction occupied by each of the coil springs about the axis is 180 degrees or less when the coil springs are disposed in the second helical groove, the circumferential direction being a direction extending about the axis of the screw shaft.

According to the above aspect of the disclosure, it is possible to provide the ball screw device including the coil springs disposed on the side toward which the ball row moves when the screw shaft is rotated, including the nut that is movable in an increased range, and having good transmission efficiency in a wide range.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
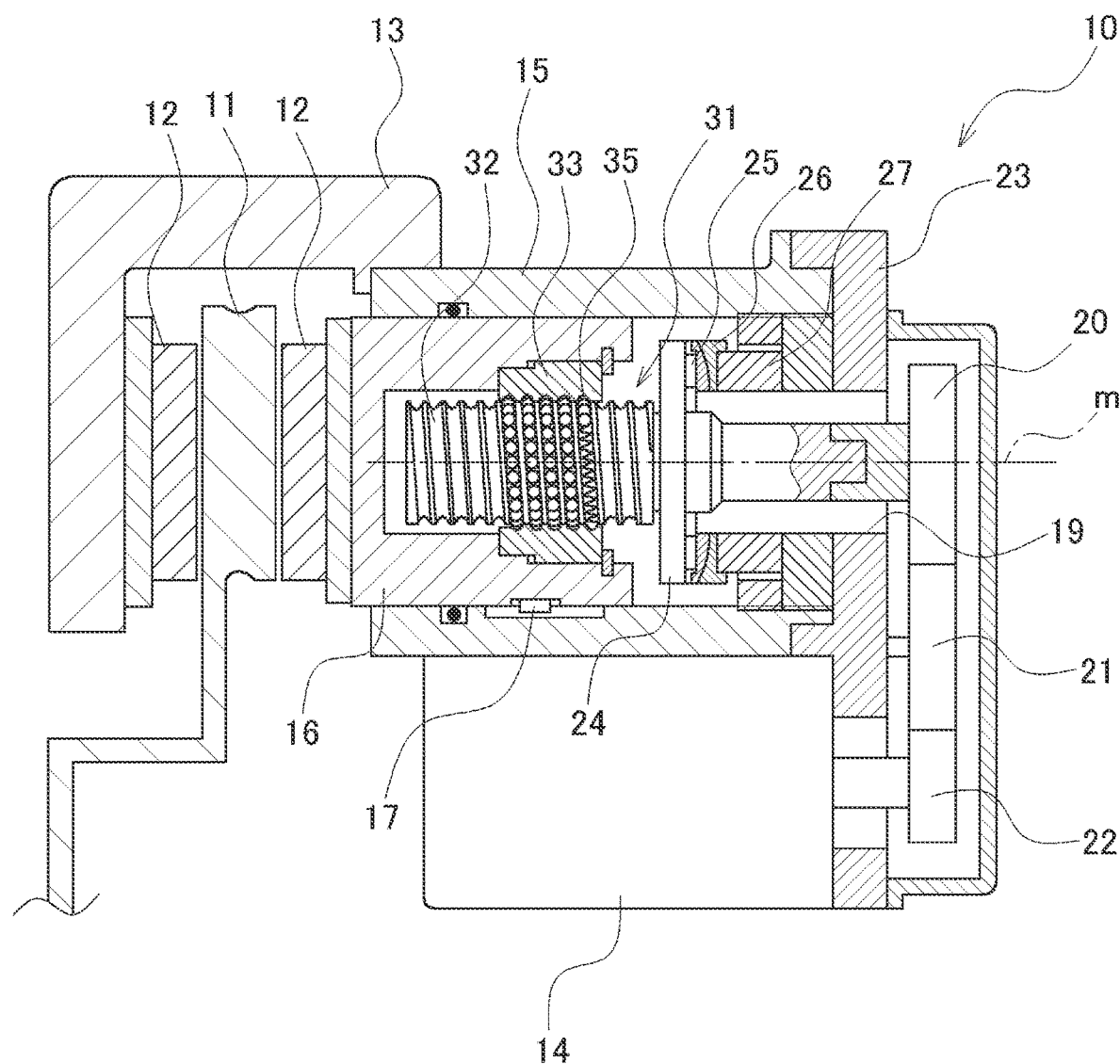
FIG. 1 is a sectional view showing an example of a brake device using a ball screw device.

An embodiment (hereinafter referred to as a first embodiment) of the disclosure will be described in detail with reference to the accompanying drawings. A ball screw device 31 of the first embodiment is used in a brake device 10 of a vehicle (for example, an automobile). FIG. 1 is an axial section showing a schematic structure of the brake device 10. The brake device 10 is a device that presses brake pads 12 against a brake rotor 11 rotating with a wheel (not shown) of the vehicle to apply a braking force by friction. In the following description, an axial direction refers to a direction of a central axis m of a screw shaft 32 of the ball screw device 31, a radial direction refers to a direction perpendicular to the central axis m, and a circumferential direction refers to a direction extending about the central axis m.

The brake device 10 includes a caliper 13, the pair of brake pads 12 with the brake rotor 11 interposed therebetween, the ball screw device 31 that biases (urges) the brake pads 12 toward the brake rotor 11, and a motor 14.

The caliper 13 is in a saddle shape and is disposed so as to cover a part of an outer periphery of the brake rotor 11. The caliper 13 is supported in a floating state by a knuckle, not shown, etc. such that the caliper 13 can move in the axial direction and is fixed in the circumferential direction. A cylinder 15 having a cylindrical inner surface is formed integrally with the caliper 13. A lid 23 is disposed on the opposite end of the cylinder 15 from the brake rotor 11, and an inner periphery of the cylinder 15 opens toward the brake rotor 11. The lid 23 has a hole 19 in its center. The hole 19 extends through the lid 23 in the axial direction. A piston 16 is inserted through the cylinder 15. The piston 16 has a cylindrical outer surface and is fitted in the cylinder 15 with a small clearance therebetween, and the piston 16 can be displaced in the axial direction toward the brake rotor 11. A sliding key 17 is disposed between fitting surfaces of the piston 16 and the cylinder 15. The piston 16 can reciprocate in the axial direction with respect to the cylinder 15 but cannot rotate in the circumferential direction.

The ball screw device 31 is mounted inside the piston 16. The ball screw device 31 is a device that includes the screw shaft 32, a nut 33, and a plurality of balls 35 and that converts a rotary motion of the screw shaft 32 to an axial motion of the nut 33. The screw shaft 32 includes a disc-shaped flange portion 24 extending in the radial direction. A thrust bearing 25, a self-aligning seat 26, and an axial force meter 27 are mounted between the flange portion 24 and the lid 23. The screw shaft 32 can therefore rotate about the central axis m but cannot move in the axial direction. The screw shaft 32 is inserted through the hole 19 of the lid 23. A gear 20 is attached to an end of the screw shaft 32, and a gear 22 is attached to a rotary shaft of the motor 14. The gear 20 meshes with the gear 22 via an intermediate gear 21. The ball screw device 31 will be described in detail later.

The motor 14 is disposed outside the caliper 13. The motor 14 rotates in a forward or reverse direction or stops in response to a signal from a control device (not shown). As the motor 14 rotates, the ball screw device 31 is operated accordingly.

The brake device 10 has the pair of brake pads 12 facing each other in the axial direction with the brake rotor 11 interposed therebetween. One of the brake pads 12 is disposed on an end of the piston 16, and the other brake pad 12 is disposed on an inner wall of the caliper 13. When the screw shaft 32 rotates with rotation of the motor 14, the piston 16 is pushed in the axial direction, so that the pair of brake pads 12 get closer to each other. Since the caliper 13 is supported in a floating state from the brake rotor 11 and can be displaced in the axial direction, the pair of brake pads 12 can hold the brake rotor 11 therebetween from respective sides in the axial direction. A braking force is thus applied to the wheel by sliding friction generated between the brake rotor 11 and the brake pads 12.

Figure 2:
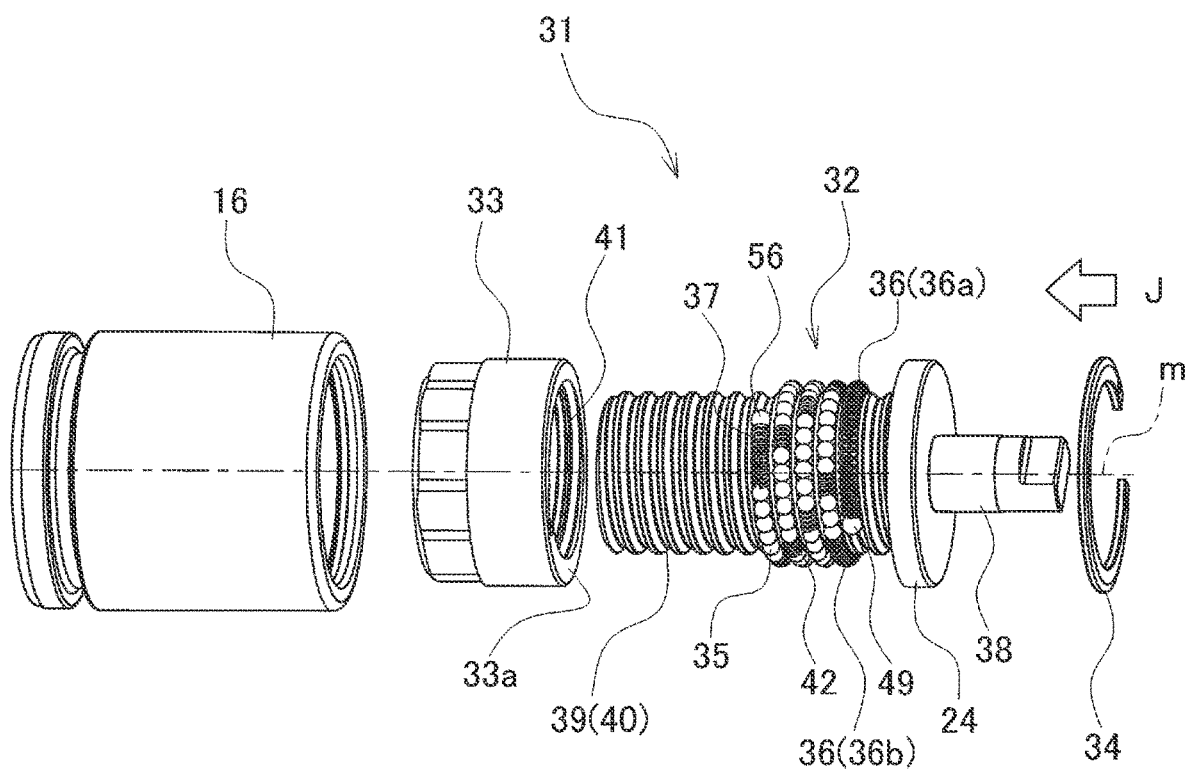
FIG. 2 is an exploded perspective view of the ball screw device.

The ball screw device 31 will be described with reference to FIG. 2. FIG. 2 is an exploded perspective view of the ball screw device 31 taken apart with its components arranged in the axial direction. For convenience of description, the piston 16 in which the nut 33 is fitted and a snap ring 34 are also shown in FIG. 2. The ball screw device 31 includes the screw shaft 32, the nut 33, the balls 35, a first-side spring member 36, and a second-side spring member 37. In the following description, the right side (one side in the axial direction) in FIG. 2 may be referred to as a first axial side, and the left side (the other side in the axial direction) in FIG. 2 may be referred to as a second axial side.

The screw shaft 32 has a helical groove formation portion 40, the flange portion 24, and a shaft portion 38 that are formed coaxially with each other. The helical groove formation portion 40 has a substantially cylindrical shape and has a first helical groove 39 formed on an outer periphery of the helical groove formation portion 40. The first helical groove 39 has an arc-shaped axial section with a radius of curvature slightly larger than that of an outer periphery of the ball 35. The first helical groove 39 is formed in a helical pattern over the entire length (entire area) of the helical groove formation portion 40 in the axial direction. The first helical groove 39 is a right-handed helical groove. More specifically, the first helical groove 39 is formed to extend clockwise around the helical groove formation portion 40 while extending toward the second axial side, as viewed in a direction of arrow J in FIG. 2. The shaft portion 38 has a substantially columnar shape with a diameter smaller than that of the helical groove formation portion 40.

The nut 33 has a substantially cylindrical shape and has a second helical groove 41 formed on an inner periphery of the nut 33. The second helical groove 41 is formed in a helical pattern over the entire length (entire area) of the nut 33 in the axial direction. The second helical groove 41 has an arc-shaped axial section with a radius of curvature slightly larger than that of the outer periphery of the ball 35. The direction of helix of the second helical groove 41 is the same as that of the first helical groove 39. The helical groove formation portion 40 of the screw shaft 32 is longer in the axial direction than the nut 33, and the first helical groove 39 is therefore formed in a larger range in the axial direction than a range in which the second helical groove 41 is formed.

The nut 33 is fitted on an outer periphery of the screw shaft 32, and the first helical groove 39 and the second helical groove 41 face each other in the radial direction to form a helical ball groove A. The balls 35 are arranged in a row along the ball groove A. As shown in FIG. 2, separating springs 42, which are coil springs with a short free length, are inserted at a plurality of positions in the row of the balls 35 at predetermined intervals. A row in which the separating springs 42 and the balls 35 are arranged along the ball groove A in this manner is referred to as a ball row P. The balls 35 contact the first helical groove 39 and the second helical groove 41 to support an external force F applied to the nut 33 in the axial direction. When the screw shaft 32 rotates, the ball row P rolls in the ball groove A. The nut 33 can thus be smoothly moved in the axial direction even when the large external force F is being applied the nut 33 in the axial direction.

The first-side spring member 36 and the second-side spring member 37 are disposed at respective ends (at respective outer sides) of the ball row P in the ball groove A. The ball screw device 31 of the first embodiment is characterized in that the first-side spring member 36 is a combination of two springs, namely a first coil spring 36a and a second coil spring 36b (see FIG. 3A). The spring members 36, 37 will be described in detail after the other configurations of the ball screw device 31.

The outer periphery of the nut 33 is fitted to an inner periphery of the piston 16. As shown in FIG. 2, a part of the outer periphery of the nut 33 in the axial direction is cylindrical, and the remaining part of the outer periphery of the nut 33 in the axial direction is polygonal. Although not shown in the figure, the inner periphery of the piston 16 has a shape similar to that of the outer periphery of the nut 33. Namely, a part of the inner periphery of the piston 16 in the axial direction is polygonal. The polygonal portion of the outer periphery of the nut 33 is fitted in the polygonal portion of the inner periphery of the piston 16, whereby the piston 16 and the nut 33 are prevented from rotating relative to each other in the circumferential direction. After the nut 33 is fitted into the piston 16, the snap ring 34 is attached to the inner periphery of the piston 16 to prevent the nut 33 from coming off from the piston 16 in the axial direction. The nut 33 is thus integrally fixed in the piston 16.

Figure 3A:
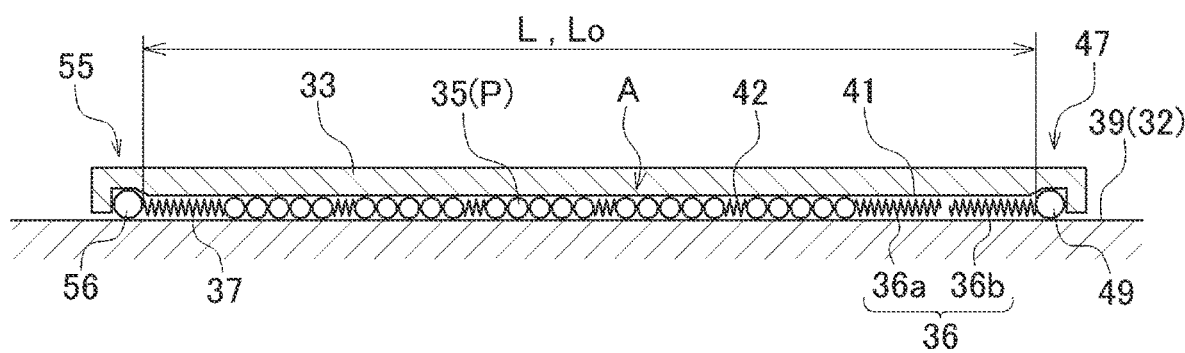
FIG. 3A is a schematic view illustrating arrangement of a ball row and coil springs in a ball groove, the ball groove being shown extended straight.
Figure 3B:
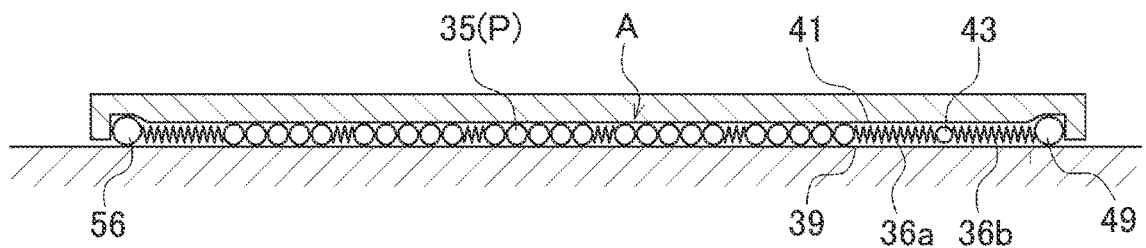
FIG. 3B shows a modification thereof.
Figure 3B:
Figure 3B:
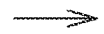
Figure 4:
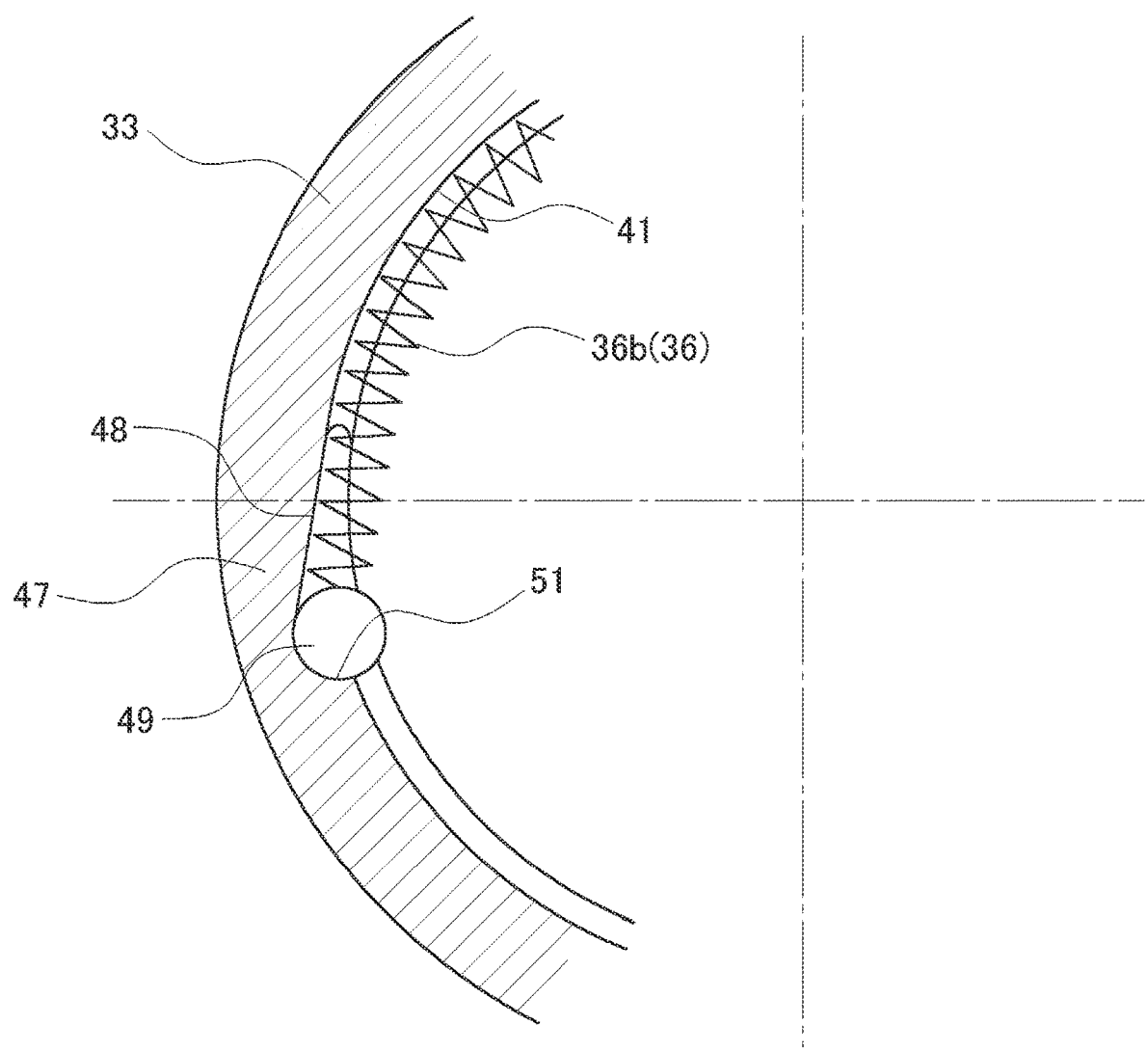
FIG. 4 is a schematic view showing the form of a first stopping portion.

Arrangement of the ball row P, the first-side spring member 36, and the second-side spring member 37 under no load condition before the ball screw device 31 is operated will be described in detail with reference to FIGS. 3A, 3B, and 4. FIG. 3A is a schematic view showing an example of arrangement of the ball row P and the coil springs 36a, 36b in the ball groove A with the ball groove A being shown extended straight. FIG. 3B is a modification example of FIG. 3A. FIG. 4 is a schematic view showing the form of a first stopping portion 47 as viewed in the direction of arrow J in FIG. 2.

As shown in FIG. 3A, the ball row P, the first-side spring member 36, and the second-side spring member 37 are arranged in a row along the ball groove A. The first stopping portion 47 and a second stopping portion 55, which are stopping members, are formed at respective ends in the axial direction of the second helical groove 41. In FIG. 4, a direction toward the upper side of the first stopping portion 47 is the direction toward the second axial side of the second helical groove 41, and a direction toward the lower side of the first stopping portion 47 is the direction toward the first axial side of the second helical groove 41. The stopping portions 47, 55 prevent the balls 35 and the spring members 36, 37 from falling off from the second helical groove 41.

The form of each of the stopping portions 47, 55 will be described with reference to FIG. 4. Since the forms of the first stopping portion 47 and the second stopping portion 55 are similar to each other, the first stopping portion 47 will be described. The first stopping portion 47 includes a first recess 48 and a first stopper ball 49. That is, a stopping member according to the disclosure may include a recess and a stopper ball. The first recess 48 is formed on the inner periphery of the nut 33 so as to be recessed radially outward such that a radial depth of the first recess 48 increases gradually from the second axial side of the second helical groove 41 toward the first axial side thereof. The first recess 48 extends from an end face 33a (see FIG. 2) of the nut 33 to an axial depth substantially equal to a groove width of the second helical groove 41.

The first stopper ball 49 is disposed in the first recess 48. The first stopper ball 49 has a larger diameter than that of each of the balls 35 forming the ball row P. The first stopper ball 49 is in contact with a wall surface 51 of the first recess 48 and is thus fixed so that the first stopper ball 49 cannot be displaced toward the first axial side.

Referring back to FIG. 3A, the first-side spring member 36 is disposed on the first axial side relative to the ball row P (i.e., the first-side spring member 36 is disposed closer to the first axial side than the ball row P is) so as to be located between the ball row P and the first stopping portion 47. The second-side spring member 37 is disposed on the second axial side relative to the ball row P (the second-side spring member 37 is disposed closer to the second axial side than the ball row P is) so as to be located between the ball row P and the second stopping portion 55.

The first-side spring member 36 includes the first coil spring 36a and the second coil spring 36b. The first coil spring 36a and the second coil spring 36b are in the same form and are compression springs having a substantially cylindrical overall shape and formed by winding a wire of spring steel, stainless spring steel, or the like into a helix. In FIG. 3A, there is a clearance between the first coil spring 36a and the second coil spring 36b for convenience of description. However, the first coil spring 36a and the second coil spring 36b are actually in contact with each other.

The first coil spring 36a and the second coil spring 36b are arranged in series along the ball groove A. The term "in series" refers to a state in which the two coil springs 36a, 36b are arranged in a row along the ball groove A. Specifically, the first coil spring 36a is disposed in proximity to the ball row P, and on the first axial side relative to the ball row P, and the second coil spring 36b is disposed between the first coil spring 36a and the first stopper ball 49.

The second-side spring member 37 includes a single coil spring (e.g., a coil spring similar to the first coil spring 36a).

As shown in FIG. 3A, when the ball row P and the spring members 36, 37 are arranged in a row in a free state, their total length L is equal to or slightly larger than the length Lo between the first stopper ball 49 and the second stopper ball 56 along the ball groove A. Accordingly, when no external force F is being applied to the ball screw device 31 in the axial direction, the balls 35 can move freely in the ball groove A. Each ball 35 is therefore displaced to a predetermined position, and the coil springs 36a, 36b and the separating springs 42 are subjected to a uniform compressive load. The positions of the balls 35 under no load condition, namely the positions of the balls 35 that are not being subjected to the external force F, are referred to as initial positions.

Next, how the balls 35 behave when the ball screw device 31 is operated and the screw shaft 32 is rotated will be described with reference to FIGS. 1 and 2. In the following description, a direction in which the screw shaft 32 and the ball row P rotate about the central axis m is the direction as viewed in the direction of arrow J in FIG. 2, unless otherwise specified.

In this example, the specifications of the first coil spring 36a and the second coil spring 36b are as follows. The coil springs 36a, 36b have the same free length and the same spring constant. The coil springs 36a, 36b also have the same allowable deflection δ that is a degree of deflection of the coil spring until the coils (i.e., turns of the wire) of the coil spring are brought into close contact with each other when compressed. Namely, the allowable deflection δ is a difference between a free length L1 of the coil spring and an overall length L2 of the coil spring at a time when the coils of the coil spring are in close contact with each other (δ=L1−L2). The free length of each of the coil springs 36a, 36b is equal to a half of a groove length (path length) corresponding to a single pitch of the ball groove A. In other words, an angle in the circumferential direction occupied by each of the coil springs 36a, 36b (i.e., a circumferential angle of each of the coil springs 36a, 36b) about the central axis m (hereinafter this angle is referred to as the "arc length") when the coil springs 36a, 36b disposed in the ball groove A are viewed in the axial direction is 180° (180 degrees). The overall arc length of the first-side spring member 36 is 360° (=180°×2). The overall allowable deflection of the first-side spring member 36 is 2×δ.

In the conventional ball screw device 81, the coil spring 90 is used as the first-side spring member, and the specifications of the coil spring 90 are generally as follows. The arc length is 180° to 270° and the allowable deflection is 1.0×δ to 1.5×δ, where δ represents the allowable deflection of the first coil spring 36a or the second coil spring 36b.

As described above, in the first embodiment, the first helical groove 39 of the screw shaft 32 is a right-handed helical groove. Accordingly, when the screw shaft 32 is rotated counterclockwise, the piston 16 is pushed toward the brake rotor 11 and the brake pads 12 are pressed against the brake rotor 11. As the brake pads 12 are pressed against the brake rotor 11, the reaction force is applied in the axial direction to the piston 16 as the external force F, whereby the balls 35 are pressed against the first helical groove 39 and the second helical groove 41. As the screw shaft 32 is rotated in this state, the balls 35 roll counterclockwise to move in the second helical groove 41 toward the first axial side. In the ball screw device 31, since a diameter d of each of the balls 35 is small, a movement amount S of the ball row P along the second helical groove 41 is approximately half a circumferential movement amount of the first helical groove 39 (i.e., circumferential movement amount by which the first helical groove 39 moves in the circumferential direction). When the ball screw device 31 is operated, the ball row P thus moves and the first-side spring member 36 is compressed by a length equal to the movement amount S. The movement amount S is similar to that in the conventional ball screw device 81 and is approximately equal to the upper limit (1.5×δ) of the allowable deflection of the coil spring 90.

In the first embodiment, the first-side spring member 36 includes the first and second coil springs 36a, 36b arranged in series, and the overall allowable deflection of the first-side spring member 36 is larger than that of the conventional ball screw device 81. In the first embodiment, the allowable deflection (2×δ) of the first-side spring member 36 is larger than that of the movement amount S of the ball row P. Accordingly, the coils of the first-side spring member 36 can be prevented from being brought into close contact with each other when the ball screw device 31 is operated and the ball row P moves. Therefore, rolling of the balls 35 is not inhibited, and the screw shaft 32 can be smoothly rotated.

Thereafter, the screw shaft 32 is rotated clockwise and the brake pads 12 are displaced away from the brake rotor 11, whereby application of the braking force to the wheel is canceled. When the brake pads 12 are thus separated from the brake rotor 11 and the external force F is no longer applied, the ball row P is biased (urged) by the first-side spring member 36 and returned to the initial position. Since displacement of the initial position of the ball row P can thus be prevented, the coils of the first-side spring member 36 are not brought into close contact with each other when the ball screw device 31 is operated again. The ball screw device 31 can therefore be used over a long period.

Next, the effect of the first-side spring member 36 of the first embodiment, namely how jamming of the first-side spring member 36 of the first embodiment is prevented, will be described (the term "jamming" refers to a coil spring having difficulty in extending and contracting as the coil spring is deformed and pressed against the inner periphery of the ball groove A). The studies by the inventors show that, in the case where only one coil spring is disposed on the side to which the ball row P moves, smoothness of rotation of the screw shaft 32 varies depending on the overall length (natural length) of the coil spring. This will be described below. The specifications per unit length of coil springs used in the following first to third test examples (which will be referred to as the coil springs D1, D2, D3, respectively) are the same as those of the first coil spring 36a or the second coil spring 36b of the first embodiment, and the coil springs D1, D2, D3 are different from each other only in overall length (represented by the arc length).

In the first test example in which the arc length of the coil spring D1 was 360°, the screw shaft 32 was not smoothly rotated. In the second test example in which the arc length of the coil spring D2 was 90° or 180°, the screw shaft 32 was always rotated smoothly regardless of whether the arc length was 90° or 180°. In the third test example in which the arc length of the coil spring D3 was 270°, the screw shaft 32 was smoothly rotated, but reduction in transmission efficiency of the ball screw device 31 was recognized in some cases. These results show that the tendency to cause jamming when the screw shaft 32 is rotated varies depending on the overall length of the coil spring. This mechanism will be specifically described below.

Figure 5:
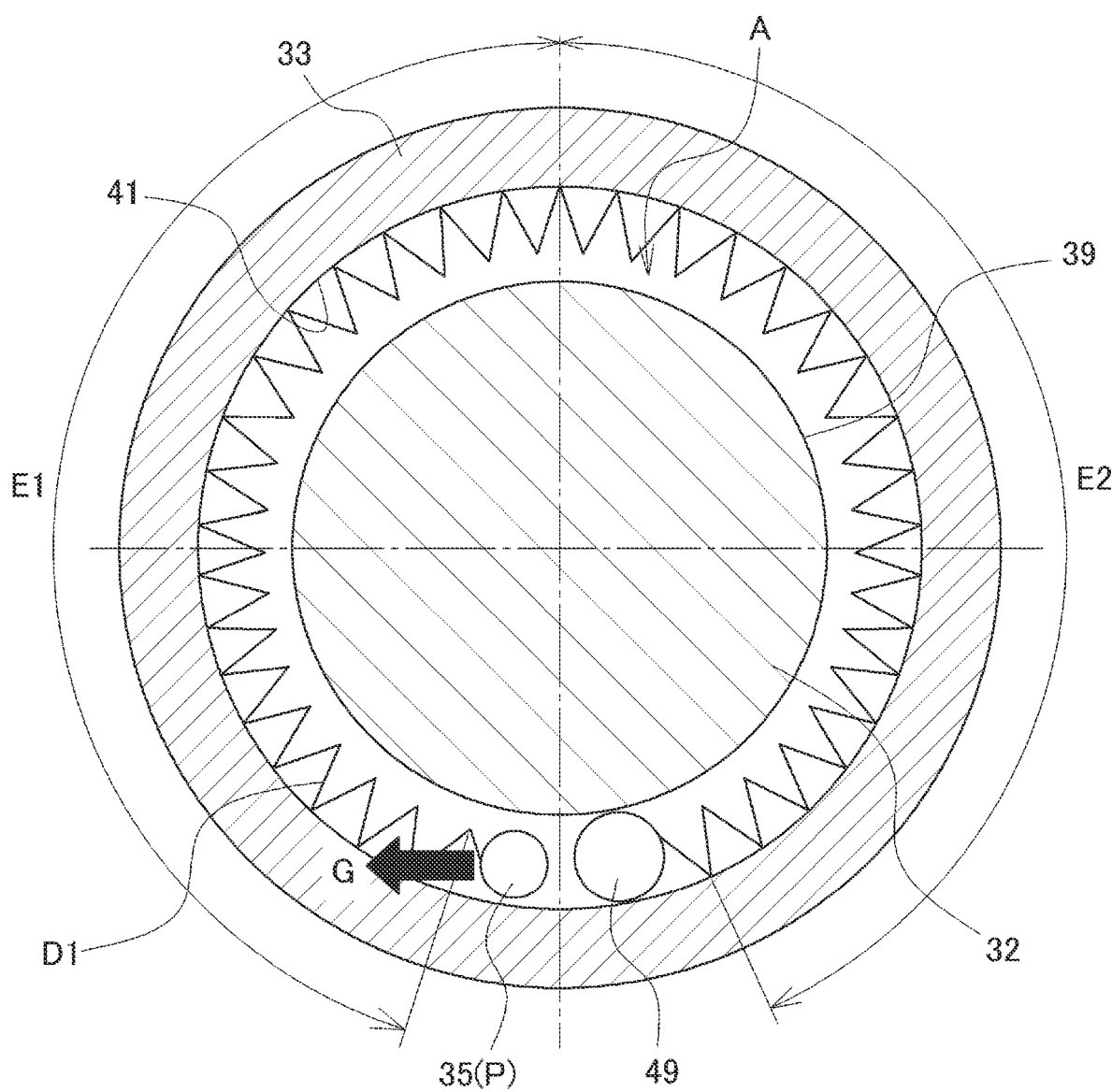
FIG. 5 is a schematic view showing a coil spring with an arc length of 360° disposed in a ball groove.

The first test example will be described with reference to FIG. 5. FIG. 5 schematically shows the form of the coil spring D1 disposed in the ball groove A, as viewed in the axial direction. In order to clearly illustrate the deformed state of the coil spring D1, a radial clearance between the ball groove A and the coil spring D1 is shown exaggerated in FIG. 5. For simplicity of the figure, the arc length of the coil spring D1 is shown slightly smaller than 360° in FIG. 5. The coil spring D1 was manufactured as a linear coil spring and is disposed in an elastically bent state, namely in a circular shape, in the ball groove A. Accordingly, when the coil spring D1 is in the ball groove A, an elastic restoring force is acting radially outward and the coil spring D1 is being pressed, along its entire circumference, against the second helical groove 41. Accordingly, when the ball row P moves and a compressive load is applied to the coil spring D1 as shown by arrow G, a large friction force is generated between the coil spring D1 and the second helical groove 41, and the coil spring D1 can hardly be deflected. Specifically, in a region E2 that is located in proximity to the first stopper ball 49 and corresponds to approximately one half of the circumference, a large friction force is generated between the outer periphery of the coil spring D1 and the second helical groove 41, and the coil spring D1 is hardly compressed. On the other hand, in a region E1 that is located in proximity to the balls 35 and corresponds to approximately the other half of the circumference, the coil spring D1 can be compressed, but since the free length in the region E1 is small, the coils of the coil spring D1 are brought into close contact with each other by movement of the ball row P. For this reason, the screw shaft 32 was not smoothly rotated in the first test example.

Figure 6:
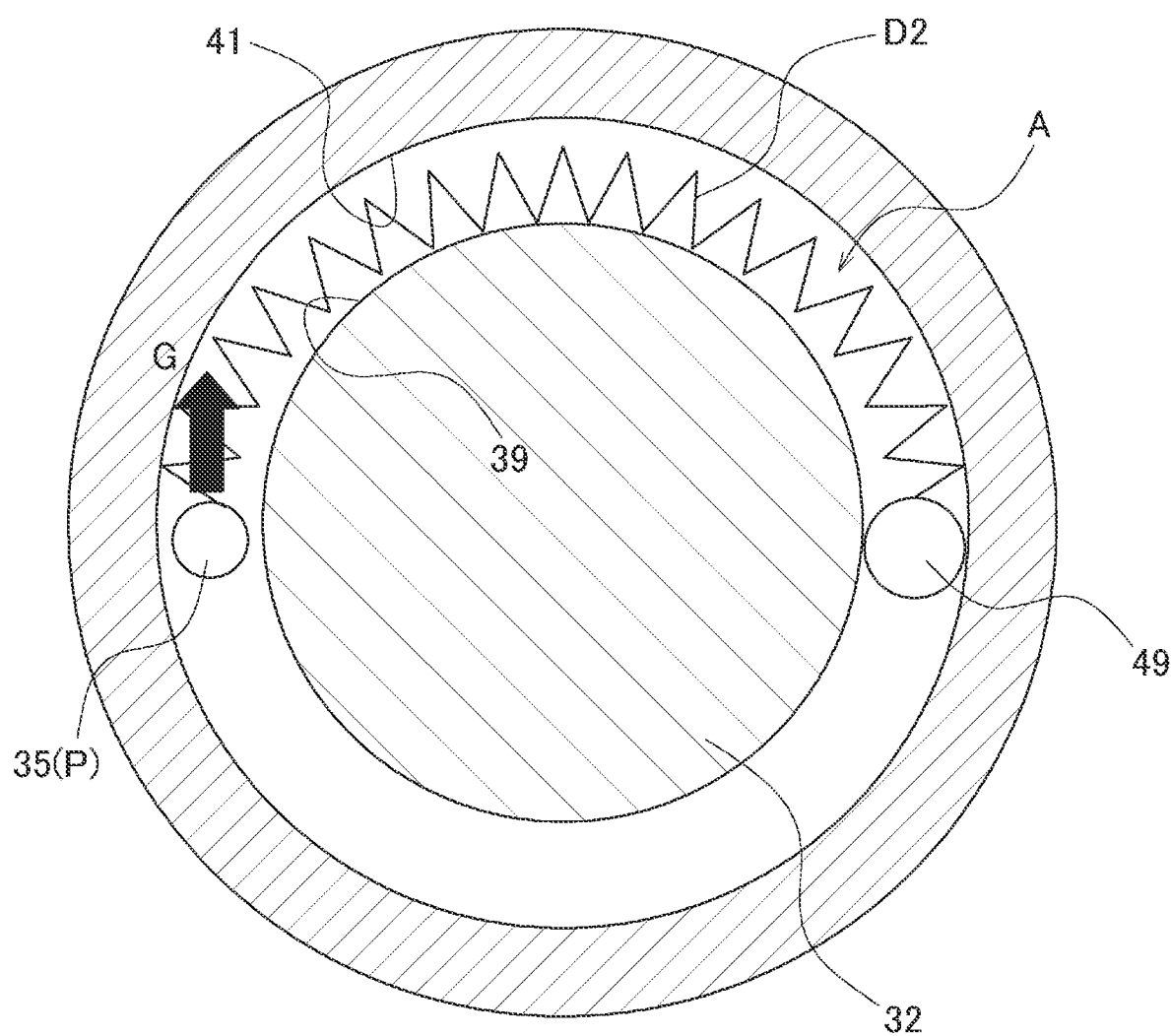
FIG. 6 is a schematic view showing a coil spring with an arc length of 180° disposed in a ball groove.
Figure 7:
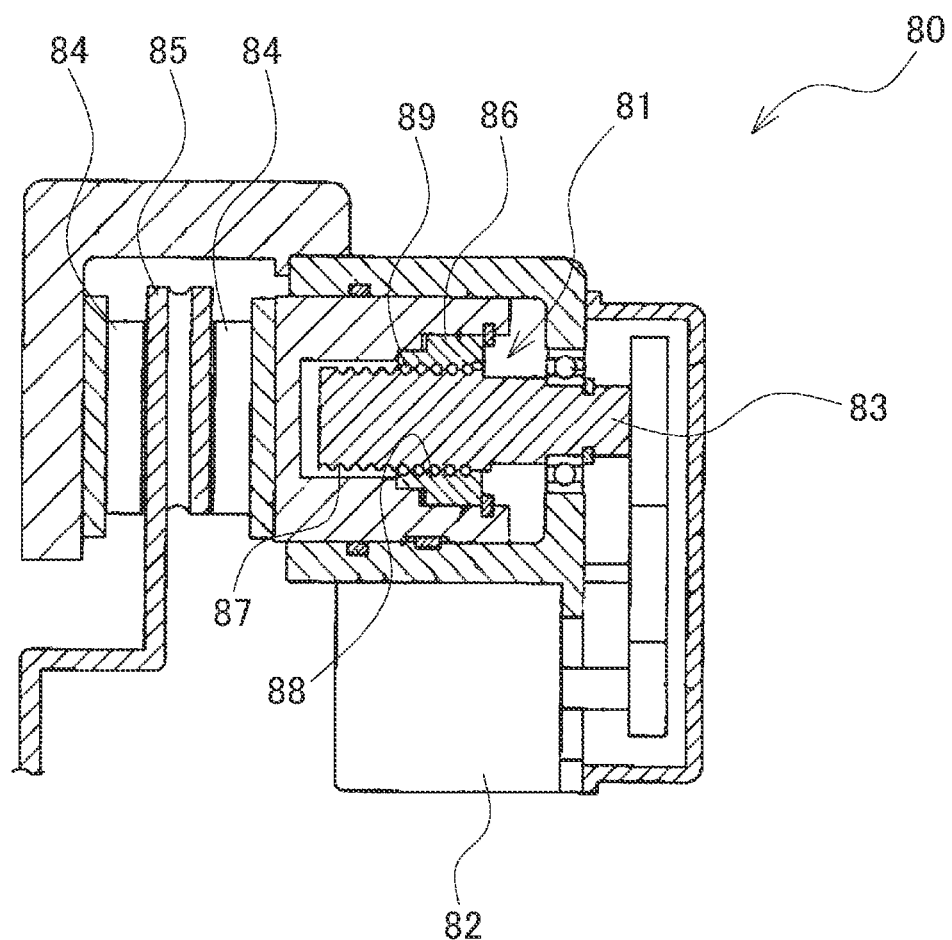
FIG. 7 is a sectional view showing the form of a brake device using a conventional ball screw device.
Figure 8:
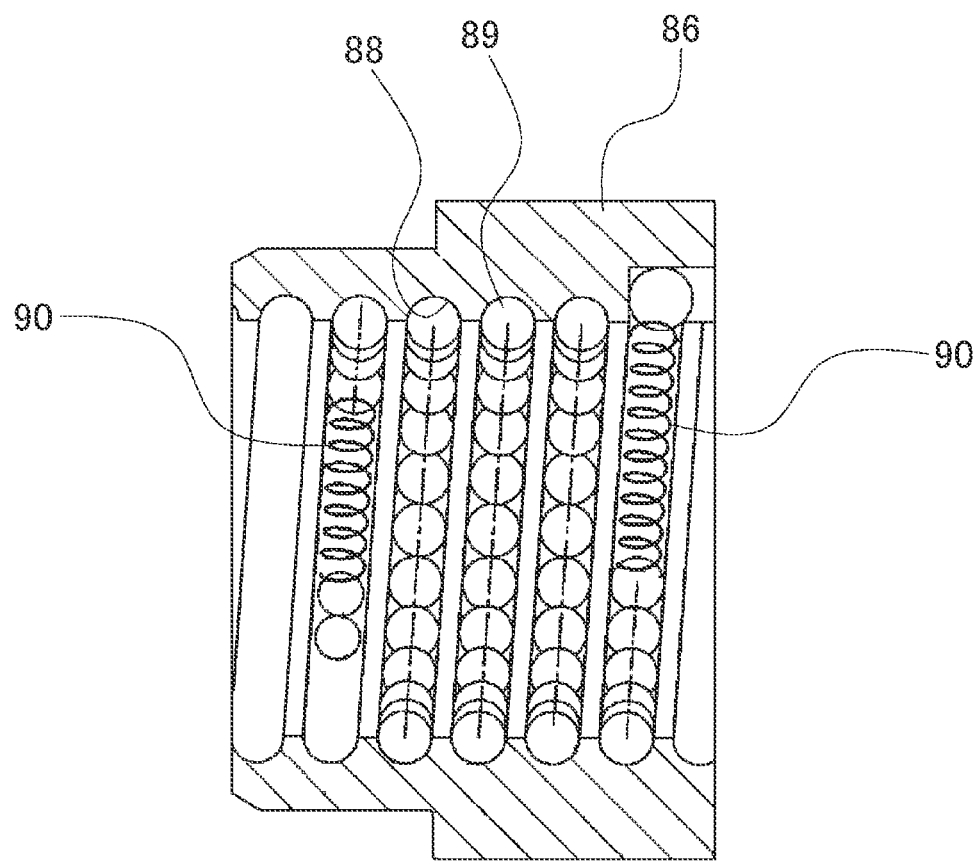
FIG. 8 is a sectional view showing the form of a ball row and coil springs which are disposed along the inner periphery of a nut in the conventional ball screw device.

The second test example will be described with reference to FIG. 6. FIG. 6 is a schematic view similar to FIG. 5. The coil spring D2 was manufactured as a linear coil spring. When the coil spring D2 is in the ball groove A, the coil spring D2 is in an elastically deformed state as shown in FIG. 6, so that both ends of the coil spring D2 are in contact with the second helical groove 41 of the nut 33 and an approximately middle part of the overall length of the coil spring D2 is separated from the second helical groove 41 and in contact with the first helical groove 39 of the screw shaft 32. Accordingly, when the ball row P moves and a compressive load is applied to one end of the coil spring D2 as shown by arrow G in FIG. 6, the middle part of the coil spring D2 is displaced radially outward and the friction between the coil spring D2 and the first helical groove 39 decreases accordingly. As a result, unlike in the first test example, the coil spring D2 can be easily deflected along its entire length. For this reason, the screw shaft 32 was smoothly rotated in the second test example. Since the same applies to the case where the arc length of the coil spring D2 is 90°, description thereof will be omitted.

In the third test example, the contact state of the coil spring D3 with the ball groove A (i.e., the state of contact between the coil spring D3 and the ball groove A) is gradually changing from the contact state in the second test example to the contact state in the first test example.

As can be seen from the above results, when the coil spring disposed in the ball groove A has an arc length of 180° or less, jamming of the coil spring can be prevented, and the coil spring can be easily deflected. However, when the arc length of the coil spring is too small, the first-side spring member 36 includes a larger number of coil springs, which degrades mountability of the first-side spring member 36 in the ball screw device 31. It is therefore preferable that the arc length of the coil spring be 45° (45 degrees) or more. In the first embodiment, each of the first coil spring 36a and the second coil spring 36b of the first-side spring member 36 has an arc length of 180°, and the first coil spring 36a and the second coil spring 36b are arranged in series. When the ball row P moves, the same compressive load G is applied to the coil springs 36a, 36b. That is, the compressive load G is applied from the ball row P to an end of the first coil spring 36a, the end being located on the second axial side, and the compressive load G is applied from the first coil spring 36a to an end of the second coil spring 36b, the end being located on the second axial side. The term "the end located on the first axial side" means "the end located closer to the first axial side than the other end is", and the term "the end located on the second axial side" means "the end located closer to the second axial side then the other end is". The direction and magnitude of the compressive load G applied to the coil spring 36a are the same as those of the compressive load G applied to the coil spring 36b. Therefore, jamming of the coil springs 36a, 36b can be prevented, and the coil springs 36a, 36b can be easily deflected. Accordingly, jamming of the first-side spring member 36 as a whole can be prevented, and the first-side spring member 36 can be easily deflected.

As described above, in the ball screw device 31 of the first embodiment, the allowable deflection of the first-side spring member 36 can be increased by arranging the first coil spring 36a and the second coil spring 36b in series. Accordingly, even when the rotation angle of the screw shaft 32 is increased, the coils of the first-side spring member 36 are not brought into close contact with each other, and the screw shaft 32 can be smoothly rotated. Moreover, since the arc length of each of the coil springs 36a, 36b of the first-side spring member 36 is 180° or less, jamming of the first-side spring member 36 can be prevented and the screw shaft 32 can be smoothly rotated. The movable range of the nut 33 can thus be increased, and the ball screw device 31 has good transmission efficiency in a wide range.

The example in which the movement amount S of the ball row P is approximately $1.5 \times \delta$ is described above. In the case where the movement amount S of the ball row P is larger than $1.5 \times \delta$, especially larger than $2 \times \delta$ (i.e., larger than the allowable deflection of the first-side spring member 36 of the first embodiment), three or more coil springs, for example, can be arranged in series (not shown) as the first-side spring member 36. In this case, each coil spring can be, for example, the same coil spring as the first coil spring 36a. The allowable deflection of the first-side spring member 36 is therefore $3 \times \delta$. The allowable deflection of the first-side spring member 36 can thus be made larger than the movement amount S of the ball row P. The coils of the first-side spring member 36 can therefore be prevented from being brought into close contact with each other. At the same time, since the arc length of each coil spring is 180°, jamming of each coil spring can be prevented, and jamming of the first-side spring member 36 as a whole can be prevented. The screw shaft 32 can thus be smoothly rotated.

Another embodiment will be described. In the first embodiment, the end of the second coil spring 36b, which is located on the second axial side, is in direct contact with an end of the first coil spring 36a, which is located on the first axial side. As shown in FIG. 3B, however, the end of the second coil spring 36b, which is located on the second axial side, may contact the end of the first coil spring 36a, which is located on the first axial side with a spacer ball 43 interposed therebetween. The spacer ball 43 is a ball with a smaller diameter than the diameter of each of the balls 35 forming the ball row P. Since the spacer ball 43 is smaller in diameter than each of the balls 35, there is a clearance between the spacer ball 43 and the first and second helical grooves 39, 41. Accordingly, the spacer ball 43 is supported by the first coil spring 36a and the second coil spring 36b and can be displaced as appropriate along the ball groove A. The movement amount S of the ball row P can therefore be equally absorbed by the first coil spring 36a and the second coil spring 36b. The first-side spring member 36 thus has a large overall allowable deflection as in the case where the first coil spring 36a and the second coil spring 36b are in direct contact with each other.

Since the first coil spring 36a and the second coil spring 36b contact each other with the spacer ball 43 interposed therebetween, the posture of each of the coil springs 36a, 36b can be stabilized even when the coil springs 36a, 36b are open-end coil springs.

The following problem occurs if the spacer ball 43 has the same size as that of each of the balls 35 forming the ball row P. Since the spacer ball 43 is held between the first helical groove 39 and the second helical groove 41, the spacer ball 43 rolls with the balls 35 of the ball row P when the screw shaft 32 is rotated. At this time, the spacer ball 43 and the ball row P move by the same distance. The first coil spring 36a is therefore hardly deflected, and only the second coil spring 36b is deflected. The coils of the second coil spring 36b are quickly brought into close contact with each other and rolling of the spacer ball 43 is hindered. Accordingly, the screw shaft 32 cannot be smoothly rotated.

Although the embodiments of the disclosure are described above, these embodiments are shown as examples of the disclosure. The disclosure is not limited to these embodiments, and these embodiments can be modified as appropriate without departing from the scope of the disclosure. For example, although the helical grooves 39, 41 of the screw shaft 32 and the nut 33 are right-handed helical grooves in the first and second embodiments, the helical grooves 39, 41 may be left-handed helical grooves. In this case, the brake pads 12 are pressed against the brake rotor 11 when the screw shaft 32 is rotated clockwise. Although the first coil spring 36a and the second coil spring 36b of the first-side spring member 36 are in the same form in the above embodiments, the first coil spring 36a and the second coil spring 36b may be different from each other in specifications such as free length and allowable deflection. In the case where the ball screw device 31 is always operated toward the first axial side, the spring member need not necessarily be provided on each of both sides of the ball row P. For example, in the case where the ball row P moves toward the first axial side when under load, the spring member on the first axial side relative to the ball row P needs to be deflected, and the spring member on the second axial side relative to the ball row P is not necessarily required. Although the ball screw device 31 is used for the brake device 10 in the first embodiment, the ball screw device 31 is also applicable to other devices.

What is claimed is:

1. A ball screw device comprising:
a screw shaft having a first helical groove provided on an outer periphery of the screw shaft;
a nut having a second helical groove provided on an inner periphery of the nut, the nut being fitted on the outer periphery of the screw shaft; and
a plurality of balls disposed between the first helical groove and the second helical groove and supports an external force, wherein:
when the screw shaft is rotated about an axis of the screw shaft while being subjected to the external force, the balls are displaced from positions under no load condition toward one side in an axial direction, the axial direction being a direction along the axis of the screw shaft,
the second helical groove includes a stopping member provided at least at an end of the second helical groove, the end being located on the one side in the axial direction, and the stopping member being configured to prevent the balls from falling off from the second helical groove,
a plurality of coil springs are arranged in series along the second helical groove so as to be located between a ball closest to the one side in the axial direction among the balls and the stopping member,
an angle in a circumferential direction occupied by each of the coil springs about the axis is 180 degrees or less when the coil springs are disposed in the second helical groove, the circumferential direction being a direction extending about the axis of the screw shaft, and
a spacer ball with a smaller diameter than a diameter of each of the balls is interposed between the coil springs.

2. The ball screw device according to claim 1, wherein the stopping member includes a recess provided on the inner periphery of the nut, and a stopper ball disposed in the recess, the stopper ball having a larger diameter than a diameter of each of the balls.

3. The ball screw device according to claim 1, wherein the angle is 45 degrees or more.

4. The ball screw device according to claim 1, wherein:
the plurality of coil springs includes a first coil spring and a second coil spring that are arranged in series along the second helical groove and that are both located between the ball closest to the one side in the axial direction among the balls and the stopping member; and
the spacer ball is located between the first coil spring and the second coil spring along the second helical groove.

* * * * *